United States Patent
Ebara

(10) Patent No.: US 6,564,638 B1
(45) Date of Patent: May 20, 2003

(54) VIBRATING GYROSCOPE HAVING AN ENHANCED SENSITIVITY

(75) Inventor: Kazuhiro Ebara, Shiga-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/459,425

(22) Filed: Dec. 13, 1999

(30) Foreign Application Priority Data

Jan. 13, 1999 (JP) .......................... 11-006502

(51) Int. Cl.[7] .............. G01P 9/04; H01L 41/08
(52) U.S. Cl. .............. 73/504.14; 73/504.12; 310/329; 310/316.01
(58) Field of Search .............. 73/504.12, 504.14, 73/504.15, 504.16, 504.04, 504.02; 310/331, 332, 329, 366, 316.01, 317, 318

(56) References Cited

U.S. PATENT DOCUMENTS

| | | | |
|---|---|---|---|
| 5,455,476 A | 10/1995 | Nakamura | 73/504.12 |
| 5,635,786 A * | 6/1997 | Fujimoto et al. | 73/504.12 |
| 5,677,486 A * | 10/1997 | Nakamura et al. | 73/504.14 |
| 6,116,086 A * | 9/2000 | Fujimoto | 73/504.14 |
| 6,158,281 A * | 12/2000 | Ebara et al. | 73/504.12 |

FOREIGN PATENT DOCUMENTS

| | | |
|---|---|---|
| EP | 0 647 830 A1 * | 4/1995 |
| JP | 6-265358 A | 9/1994 |
| JP | 7-139952 A | 6/1995 |
| JP | 7174570 | 7/1995 |
| JP | 7-332988 A | 12/1995 |
| JP | 8-178666 A | 7/1996 |
| JP | 8-338729 A | 12/1996 |
| JP | 9-033259 A | 2/1997 |
| JP | 9-105638 A | 4/1997 |

* cited by examiner

Primary Examiner—Helen Kwok
(74) Attorney, Agent, or Firm—Keating & Bennett, LLP

(57) ABSTRACT

A vibrating gyroscope includes: a vibrator having an driving electrode and two detecting electrodes; a first drive circuit for applying a first drive signal to the driving electrode; a second drive circuit for applying a second drive signal having an inverted phase of the drive signal, or an inverted phase of a detection signal detected from the two detecting electrodes, to the detecting electrodes; and a detection circuit for detecting the detected signal in correspondence with the rotational angular velocity from the two detecting electrodes.

14 Claims, 7 Drawing Sheets

VIBRATING GYROSCOPE HAVING AN ENHANCED SENSITIVITY

BACKGROUND OF THE INVENTION

1. Field of the Invention

This invention relates to a vibrating gyroscope, and more particularly to a vibrating gyroscope which can be applied in, for example, a navigation system for detecting the position of a mobile body by detecting its rotational angular velocity and carrying out appropriate course corrections, or in a vibration eliminating system, such as a shake-prevention device, for detecting a rotational angular velocity caused by external vibration such as shaking.

2. Description of the Related Art

FIG. 8 is a diagrammatic view of an example of conventional vibrating gyroscope. The vibrating gyroscope 1 shown in FIG. 8 comprises a vibrator 2. The vibrator 2 comprises a vibrating body 3 having a square rod-shape. The vibrating body 3 comprises a thin-strip-shaped first piezoelectric substrate 3a and a second piezoelectric substrate 3b which are laminated and affixed together. As shown by the arrows P in FIG. 8, the first piezoelectric substrate 3a and the second piezoelectric substrate 3b are polarized in opposite directions parallel to their thickness. A common electrode 4 is provided as an driving electrode on a main face of the first piezoelectric substrate 3a. Furthermore, two divided electrodes 5a and 5b, as two detecting electrodes are provided on a main surface of the second piezoelectric substrate 3b so as to be spaced apart along a longitudinal direction of the main surface of the second piezoelectric substrate 3b. Moreover, an intermediate electrode 6 is provided between the first piezoelectric substrate 3a and the second piezoelectric substrate 3b.

The two divided electrodes 5a and 5b of the vibrator 2 are connected with two input terminals of an adder circuit 7. The output terminal of the adder circuit 7 is connected to the input terminal of an oscillator circuit 8. The output terminal of the oscillator circuit 8 is connected to the common electrode 4 of the vibrator 2. Furthermore, the two divided electrodes 5a and 5b of the vibrator 2 are connected via resistors 9a and 9b to a middle point forming a reference voltage, such as a middle voltage which is a half voltage of the power voltage. Moreover, the two divided electrodes 5a and 5b of the vibrator 2 are connected to two input terminals of a detection circuit 10 comprising a differential amplifier.

In the vibrating gyroscope 1 shown in FIG. 8, a drive signal is output from the oscillator circuit 8 via the adder circuit 7, and is applied to the common electrode 4 of the vibrator 2. This drive signal causes the first piezoelectric substrate 3a and the second piezoelectric substrate 3b to vibrate reversely together, and as a result, the vibrator 2 vibrates at a right angle to the main faces of the first piezoelectric substrate 3a and the second piezoelectric substrate 3b. When the vibrator 2 is not rotating, similar detection signals are obtained from the divided electrodes 5a and 5b. Then, when a rotational angular velocity other than zero around the center axis of the vibrating body 3 is added to the vibrator 2, the Coriolis force changes the direction of the vibration of the vibrator 2, whereby detection signals corresponding to that rotational angular velocity are obtained from each of the two divided electrodes 5a and 5b. In this case, in correspondence with the rotational angular velocity, for instance, the voltage of the detection signal from one divided electrode 5a increases, and the voltage of the detection signal from the other divided electrode 5b decreases. Therefore, in this vibrating gyroscope 1, it is possible to detect the rotational angular velocity using the signal between the divided electrodes 5a and 5b, that is, the output signal of the detection circuit 10.

However, when a vibrating gyroscope such as the vibrating gyroscope 1 shown in FIG. 8 is miniaturized and its power voltage is reduced, the amplitude of the vibrations of the vibrator decreases, lowering the sensitivity of the vibrator. When the sensitivity of the vibrator of the vibrating gyroscope is lowered in this way, the S/N (signal to noise ratio) of the output signal of the vibrating gyroscope deteriorates, and the resolution also worsens. In particular, noise in the S/N in this case is mainly circuit noise and the like.

Furthermore, in a vibrating gyroscope, it is desirable that the temperature characteristics of the sensitivity can be easily altered.

SUMMARY OF THE INVENTION

The present invention can solve the aforementioned problem associated with the conventional art and provides a vibrating gyroscope which has a sensitivity and/or an adjustable temperature characteristics of the sensitivity.

The vibrating gyroscope comprises a vibrator having an driving electrode and two detecting electrodes; first drive means for applying a first drive signal to the driving electrode; second drive means for applying a second drive signal having the phase of the drive signal, or a phase obtained by inverting the phase of a detected signal detected from the two detecting electrodes, to the detecting electrodes; and detection means for detecting a detected signal in correspondence with the rotational angular velocity from the two detecting electrodes.

In the vibrating gyroscope according to the present invention, the first drive means for instance comprises an adder circuit, two input terminals thereof being connected to the two detecting electrodes, and an oscillator circuit, an input terminal thereof being connected to the output terminal of the adder circuit, and the output terminal thereof being connected to the driving electrode.

In the vibrating gyroscope according to the present invention, the second drive means for instance comprises a phase inversion circuit, an input terminal of the phase inversion circuit being connected to the output terminal of the adder circuit, and the output terminal being connected via two resistors to the two detecting electrodes.

In the vibrating gyroscope according to the present invention, the second drive means comprises for instance a phase inversion circuit, an input terminal of the phase inversion circuit being connected to the output terminal of the oscillator circuit, and the output terminal being connected via two resistors to the two detecting electrodes.

In the vibrating gyroscope according to the present invention, the second drive means comprises for instance an impedance conversion circuit, the input terminal thereof being connected to one of the two detecting electrodes; and a phase inversion circuit, an input terminal of the phase inversion circuit being connected to the output terminal of the impedance conversion circuit, and the output terminal being connected via two resistors to the two detecting electrodes.

In the vibrating gyroscope according to the present invention, the second drive means such as a phase inversion circuit may be given predetermined temperature characteristics, in order to give desired temperature characteristics to the applied voltage of the other drive signal.

In the vibrating gyroscope according to the present invention, the first drive means applies a first drive signal to the driving electrode of the vibrator, and second drive means applies second drive signal to the two detecting electrodes of the vibrator, these drive signals having reverse phases, thereby increasing the amplitude of the drive signal applied between the driving electrode and the two detecting electrodes of the vibrator. Since the amplitude of the drive signal applied to the vibrator increases in this way, the sensitivity of the vibrating gyroscope is higher, its S/N improves, and its resolution is better thereby realizing a vibrating gyroscope having a small body or a vibrating gyroscope which can be operated with a low supply voltage.

Furthermore, in the vibrating gyroscope according to the present invention, when for instance the phase inversion circuit or the like is given predetermined temperature characteristics in order to give desired temperature characteristics to the applied voltage of the other drive signal, sensitivity having the desired temperature characteristics is obtained. Therefore, in the vibrating gyroscope according to the present invention, it is possible to easily change the temperature characteristics of sensitivity.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 1:
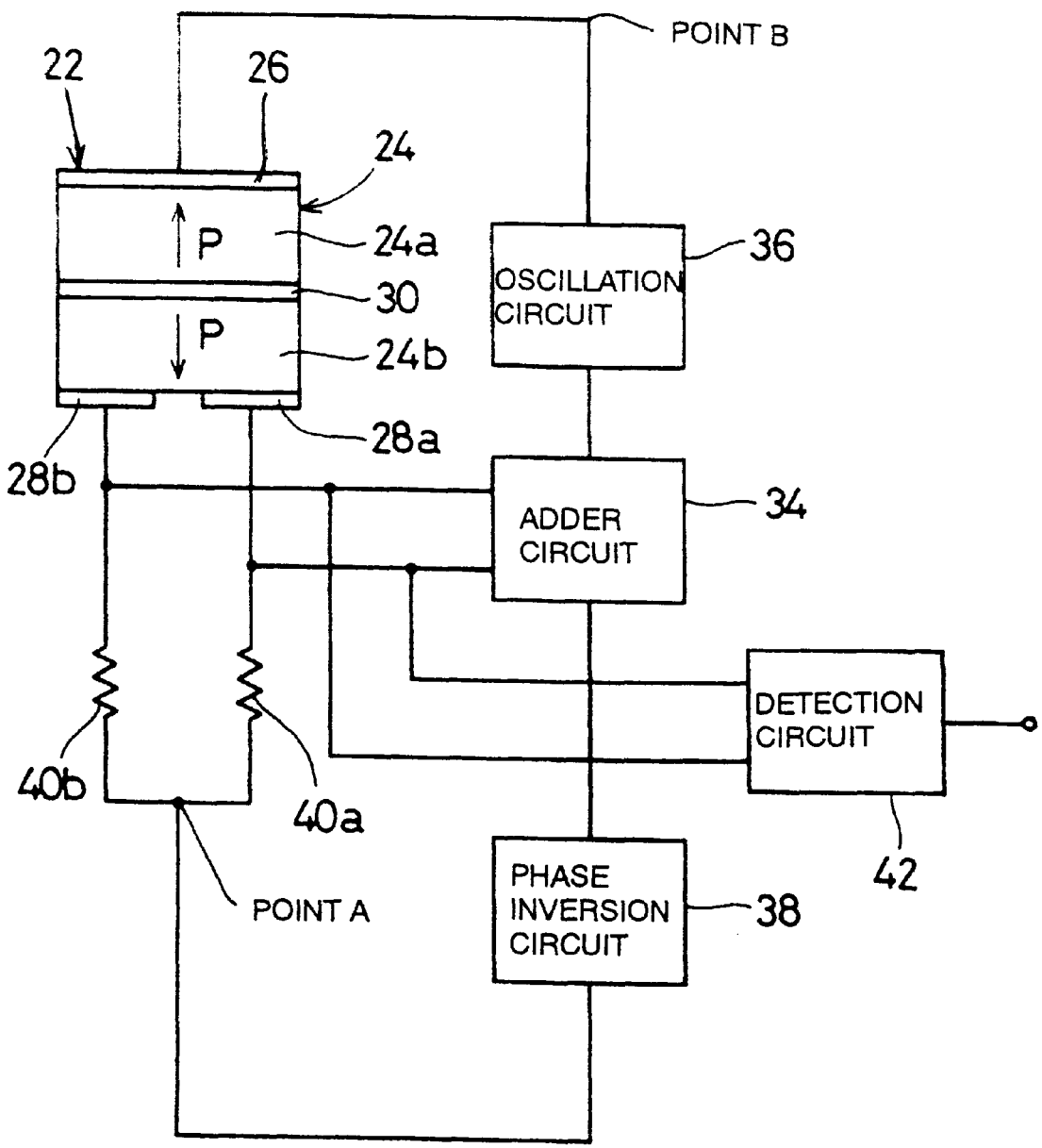
FIG. 1 is a diagrammatic view of an example of a vibrating gyroscope according to the present invention.
Figure 2:
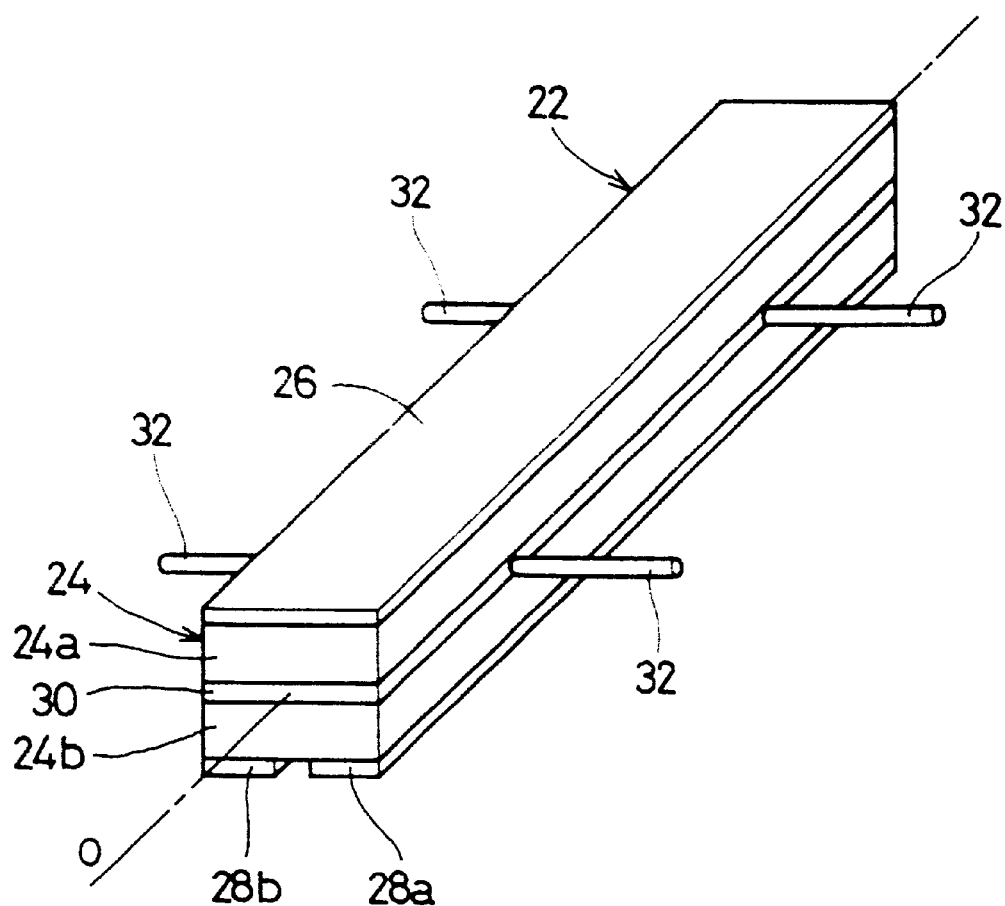
FIG. 2 is a perspective view of a vibrator used in the vibrating gyroscope shown in FIG. 1.

FIG. 1 is a diagrammatic view of an example of a vibrating gyroscope according to the present invention, and FIG. 2 is a perspective view of a vibrator used in the vibrating gyroscope shown in FIG. 1. The vibrating gyroscope 20 shown in FIG. 1 comprises a vibrator 22.

As shown in FIG. 2, the vibrator 22 comprises a vibrating body 24 having for instance a square rod-shape, and the vibrating body 24 comprises for instance a thin-strip-shaped first piezoelectric substrate 24a and a second piezoelectric substrate 24b. The first piezoelectric substrate 24a and the second piezoelectric substrate 24b are laminated and affixed together. Furthermore, as shown by the arrows P in FIG. 1, the first piezoelectric substrate 24a and the second piezoelectric substrate 24b are polarized in opposite directions parallel to their thickness. The polarization directions of the first piezoelectric substrate 24a and the second piezoelectric substrate 24b may be facing toward each other instead.

A common electrode 26 is provided as an driving electrode on a main face of the first piezoelectric substrate 24a. Furthermore, two divided electrodes 28a and 28b, as two detecting electrodes are provided on a main face of the second piezoelectric substrate 24b so as to be separated apart along the longitudinal direction of the main surface of the second piezoelectric substrate 24b. Moreover, a intermediate electrode 30 is provided between the first piezoelectric substrate 24a and the second piezoelectric substrate 24b. This intermediate electrode 30 may be omitted.

Figure 3:
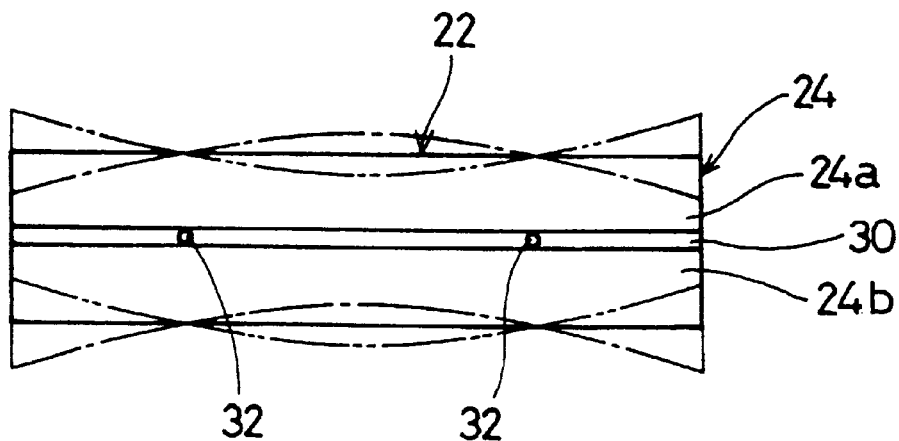
FIG. 3 is a side diagrammatic view of the state of vibration of the vibrator shown in FIG. 2.

In the vibrator 22, since the first piezoelectric substrate 24a and the second piezoelectric substrate 24b are polarized in reverse directions along their thickness, when a drive signal such as, for instance, a sinusoidal wave signal is applied between the common electrode 26 and the two divided electrodes 28a and 28b, the first piezoelectric substrate 24a and the second piezoelectric substrate 24b vibrate in reverse directions to each other. In this case, when the first piezoelectric substrate 24a is extending in a direction parallel to its main face, the second piezoelectric substrate 24b compresses in a direction parallel to its main face. Conversely, when the first piezoelectric substrate 24a compresses in a direction parallel to its main face, the second piezoelectric substrate 24b extends in a direction parallel to its main face. As a consequence, as shown in FIG. 3, the first piezoelectric substrate 24a and the second piezoelectric substrate 24b vibrate in a direction at a right angle to their main faces, with the portion slightly to the inner side of both ends of their length direction as a node portion. Therefore, supporting members 32, which are for instance linear, are provided near the node portion of the vibrator 22, as shown in FIG. 2, for supporting the vibrator 22. Even when supporting members 32 are provided near the node portion in the top face or bottom face of the vibrator 22, they can support the vibrator 22 without greatly affecting its vibration.

As shown in FIG. 1, to apply a drive signal such as that explained above to the vibrator 22, the two divided electrodes 28a and 28b of the vibrator 22 are connected to two input terminals of an adder circuit 34. The output terminal of the adder circuit 34 is connected to the input terminal of an oscillator circuit 36. The output terminal of the oscillator circuit 36 is connected to the common electrode 26 of the vibrator 22. Moreover, the output terminal of the adder circuit 34 is connected to the input terminal of a phase inversion circuit 38. The output terminal of the phase inversion circuit 38 is connected via two resistors 40a and 40b to the two divided electrodes 28a and 28b of the vibrator 22.

Furthermore, the two divided electrodes 28a and 28b of the vibrator 22 are connected to two input terminals of a detection circuit 42 comprising a differential amplifier circuit.

In this vibrating gyroscope 20, a drive signal such as for instance a sinusoidal wave signal, output via the adder circuit 34 from the output terminal of the oscillator circuit 36, is applied to the common electrode 26 of the vibrator 22, and in addition, another drive signal, output via the adder circuit 34 from the output terminal of the phase inversion circuit 38, is applied via the resistors 40a and 40b to the two divided electrodes 28a and 28b of the vibrator 22. In this case, the drive signal output from the oscillator circuit 36 and the other drive signal output from the phase inversion circuit 38 have reverse phases.

As a result of the above drive signals, the first piezoelectric substrate 24a and the second piezoelectric substrate 24b of the vibrator 22 vibrate in directions at right angles to their main faces, as shown in FIG. 3.

In this state, when the vibrating gyroscope 20 rotates around the central axis O (FIG. 2) of the vibrator 22, a Coriolis force in correspondence with the rotational angular velocity works parallel to the main faces of the first piezoelectric substrate 24a and the second piezoelectric substrate 24b, and at a right angle to the central axis O of the vibrator 22. Therefore, the direction of the vibration of the vibrator 22 changes. Consequently, a signal in correspondence with the rotational angular velocity is generated between the two divided electrodes 28a and 28b.

Then, the signal generated between the two divided electrodes 28a and 28b is detected by the detection circuit 42.

Therefore, in this vibrating gyroscope 20, it is possible to determine the rotational angular velocity using the output signal of the detection circuit 42.

Figure 8:
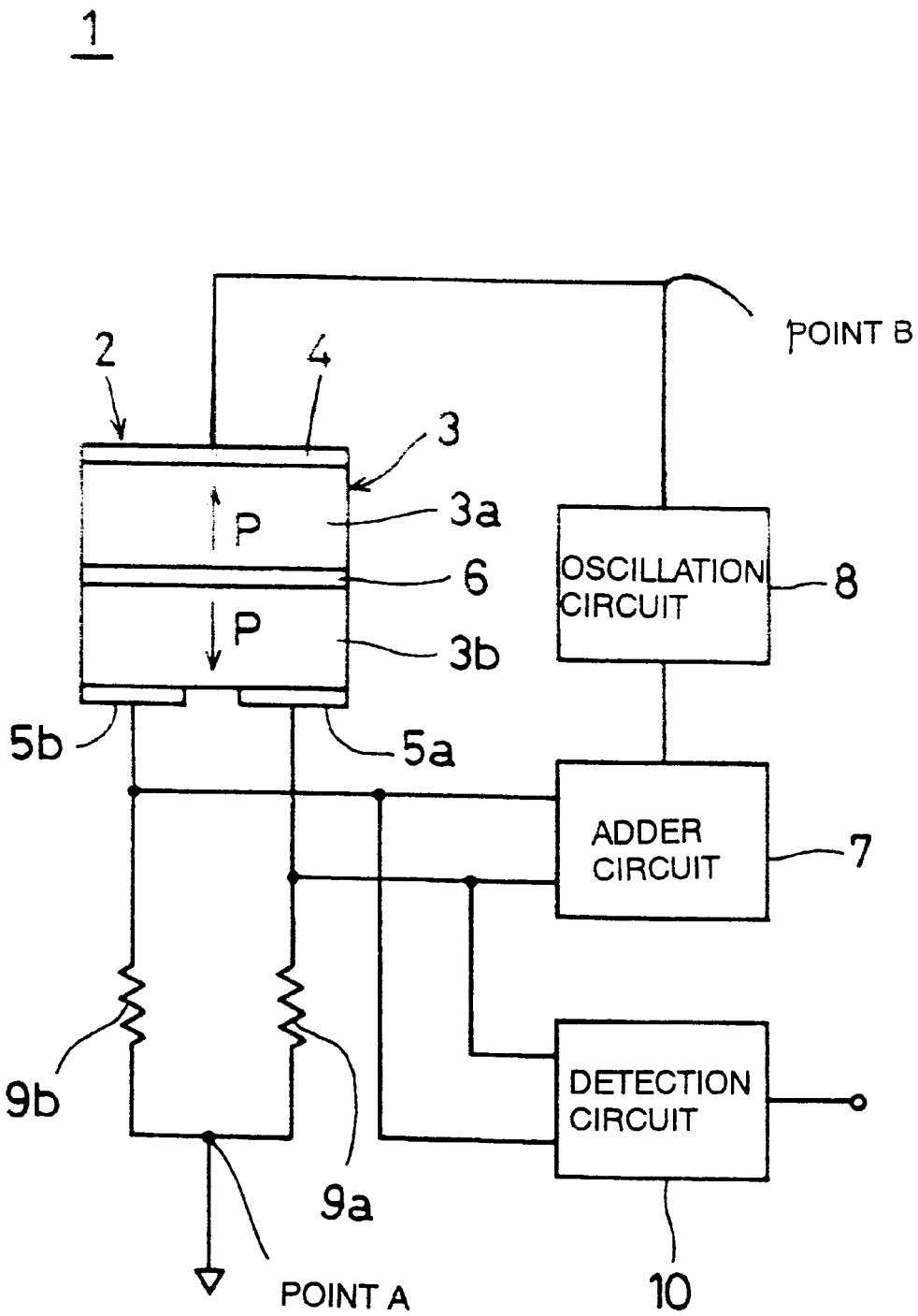
FIG. 8 is a diagrammatic view of an example of a conventional vibrating gyroscope.

In the vibrating gyroscope 20 shown in FIG. 1, the drive signal output from the output terminal of the oscillator circuit 36 is applied to the common electrode 26 of the vibrator 22, and in addition, the other drive signal output from the output terminal of the phase inversion circuit 38 is applied via the resistors 40a and 40b to the two divided electrodes 28a and 28b of the vibrator 22, the drive signals having reverse phases, and consequently, in comparison with the vibrating gyroscope 1 shown in FIG. 8, the amplitude of the drive signal applied between the common electrode of the vibrator and the two divided electrodes is greater, the sensitivity of detecting the rotational angular velocity is higher, the S/N is improved, and resolution is better.

Table 1 shows the sensitivity of the vibrating gyroscope 1 shown in FIG. 8 as the sensitivity of a conventional vibrator, the sensitivity of the vibrating gyroscope 20 shown in FIG. 1 as the sensitivity of the vibrator of the present embodiment, and the ratio of sensitivity between the sensitivity of the vibrating gyroscope 1 shown in FIG. 8 and the sensitivity of the vibrating gyroscope 20 shown in FIG. 1. In this case, the average value of sensitivity of ten conventional example is expressed as 1.00, and ten examples of sensitivity are shown separately, etc.

TABLE 1

| Sample No. | Sensitivity of conventional example | Sensitivity of embodiment | Ratio of sensitivity |
| --- | --- | --- | --- |
| 1 | 1.13 | 2.15 | 1.91 |
| 2 | 1.18 | 2.21 | 1.88 |
| 3 | 1.13 | 2.01 | 1.84 |
| 4 | 0.96 | 1.87 | 1.94 |
| 5 | 0.98 | 1.85 | 1.88 |
| 6 | 0.95 | 1.86 | 1.97 |
| 7 | 0.90 | 1.80 | 2.00 |
| 8 | 0.94 | 1.85 | 1.96 |
| 9 | 0.95 | 1.85 | 1.95 |
| 10 | 0.91 | 1.77 | 1.95 |
| Averagevalue | 1.00 | 1.93 | 1.93 |

From the results of Table 1, it can be understood that the sensitivity of the vibrating gyroscope 20 shown in FIG. 1 is higher than that of the vibrating gyroscope 1.

Furthermore, in the vibrating gyroscope 20 shown in FIG. 1, by giving an amplifying function such as an amplifier circuit to the phase inversion circuit 38, it is possible to further increase the amplitude of the other drive signal applied via the two resistors 40a and 40b to the two divided electrodes 28a and 28b of the vibrator 22, and consequently, it is possible to further increase the sensitivity, it is possible to further improve the S/N, and to improve the resolution.

Table 2 shows the crest value (V) at point A, that is, the connection point of the two resistors connected to the two divided electrodes of the vibrator, and the crest value (V) at point B, that is, the common electrode of the vibrator, and the ratio of sensitivity of the present embodiment to the sensitivity of the conventional example, in the conventional example (the vibrating gyroscope 1 shown in FIG. 8) and the present embodiment (in which an amplifying function has been given to the phase inversion circuit 38 of the vibrating gyroscope 20 shown in FIG. 1).

TABLE 2

| | Crest value of drive signal of point A | Crest value of drive signal of point B | Ratio of sensitivity |
| --- | --- | --- | --- |
| Conventional Example | 0 | 1.59 | 1 |
| Embodiment | 1.30 | 1.63 | 1.85 |
| | 1.57 | 1.64 | 2.07 |
| | 1.81 | 1.63 | 2.21 |
| | 2.06 | 1.63 | 2.36 |

From the results of Table 2, it can be understood that the sensitivity of the vibrating gyroscope 20 shown in FIG. 1 is still further higher than that of the vibrating gyroscope 1 shown in FIG. 8.

Figure 4:
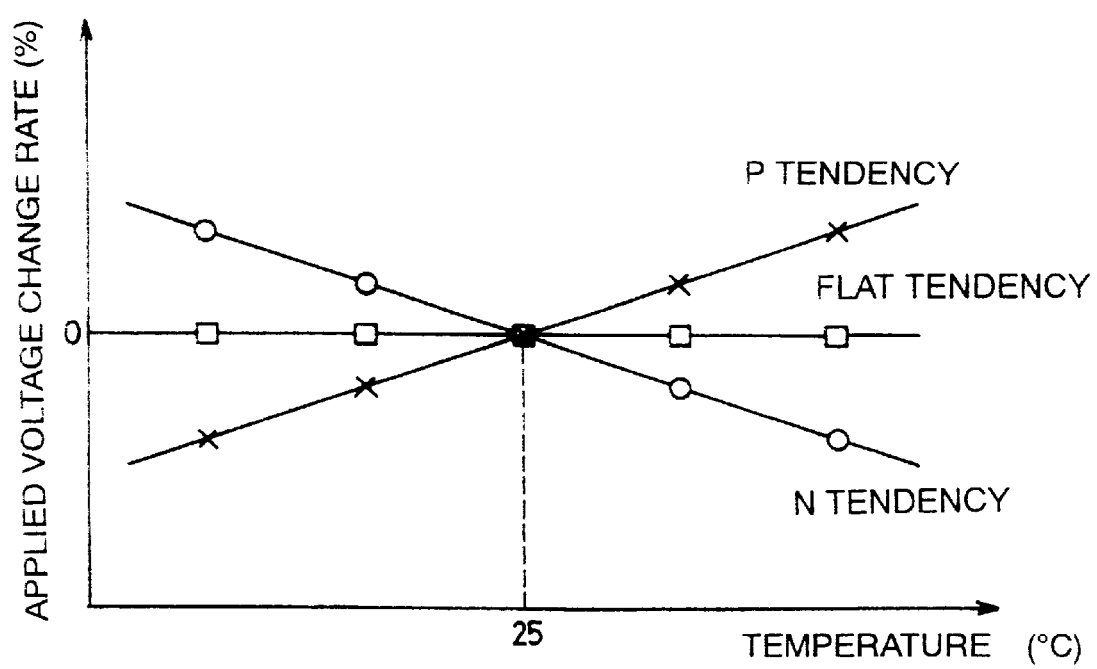
FIG. 4 is a graph showing temperature characteristics of applied voltage of another drive signal which is output from a phase inversion circuit and applied to two resonators.
Figure 5:
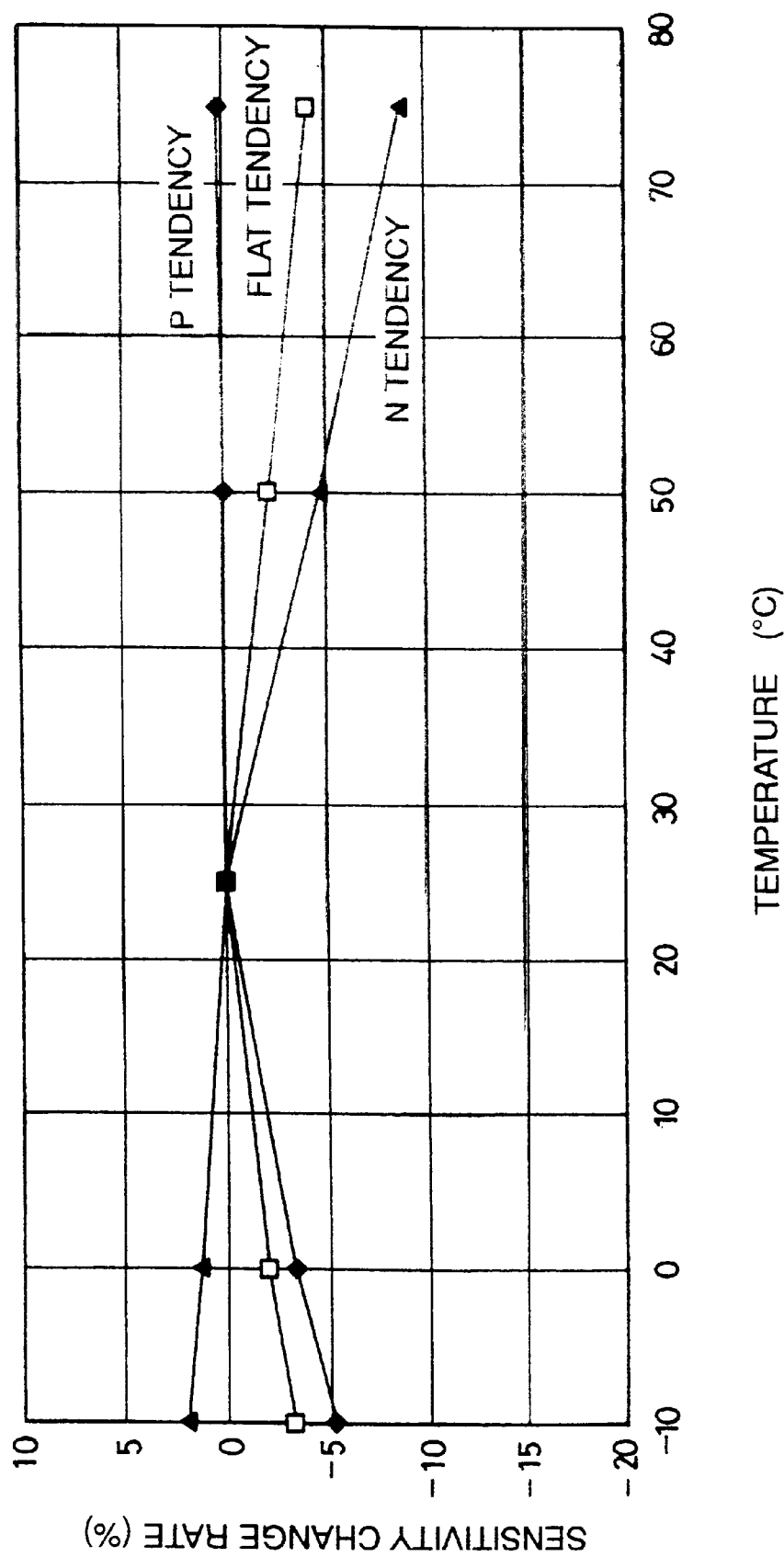
FIG. 5 is a graph showing temperature characteristics of sensitivity of a vibrating gyroscope.

Furthermore, in the vibrating gyroscope 20 shown in FIG. 1, by changing the temperature characteristics of the amplification factor of the phase inversion circuit 38, it is possible to change the temperature characteristics of the application voltage of the other drive signal, which is output from the phase inversion circuit 38 and applied to the two resistors 40a and 40b, and consequently, it is possible to easily change the temperature characteristics of the sensitivity. For instance, by changing the temperature characteristics of the amplification factor of the phase inversion circuit 38, and thereby changing the temperature characteristics of the application voltage of the other drive signal, which is output from the phase inversion circuit 38 and applied to the two resistors 40a and 40b, to the temperature characteristics of P tendency (+2000 ppm/–C), flat tendency (0 ppm/–C), and N tendency (–2000 ppm/–C), as shown in FIG. 4, the temperature characteristics of the sensitivity of the vibrating gyroscope 20 can be changed to the P tendency, the flat tendency, and the N tendency shown in FIG. 5.

Figure 6:
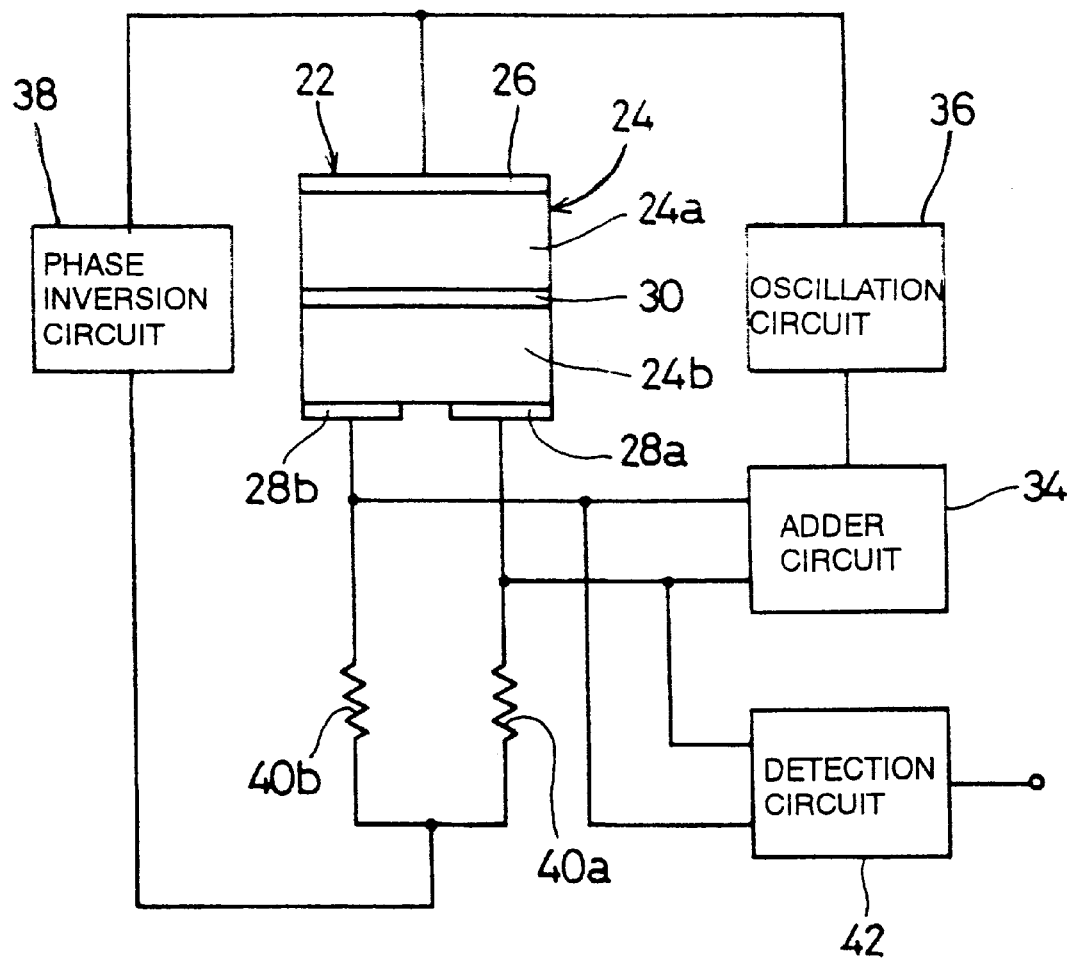
FIG. 6 is a diagrammatic view of another example of a vibrating gyroscope according to the present invention.

FIG. 6 is a diagrammatic view of another example of the vibrating gyroscope according to the present invention. In the vibrating gyroscope 20 shown in FIG. 6, in comparison with the vibrating gyroscope 20 shown in FIG. 1, the input terminal of the phase inversion circuit 38 is connected to the output terminal of the oscillator circuit 36. In addition, the output terminal of the phase inversion circuit 38 connects to the two divided electrodes 28a and 28b of the vibrator 22 via the resistors 40a and 40b.

In the vibrating gyroscope 20 shown in FIG. 6, a drive signal, output from the output terminal of the oscillator circuit 36 via the adder circuit 34, is applied to the common electrode 26 of the vibrator 22, and in addition, another drive signal, output via the adder circuit 34 from the output terminal of the phase inversion circuit 38, is applied via the resistors 40a and 40b to the two divided electrodes 28a and 28b of the vibrator 22. In this case, the drive signals have reverse phases.

Consequently, in comparison with the vibrating gyroscope 1 shown in FIG. 8, in the vibrating gyroscope 20 shown in FIG. 6, the amplitude of the drive signal applied between the common electrode of the vibrator and the two divided electrodes is greater, the sensitivity of detecting the rotational angular velocity is higher, the S/N is improved, and resolution is better.

Table 3 shows the sensitivity of the vibrating gyroscope 1 shown in FIG. 8 as the sensitivity of a conventional vibrator, the sensitivity of the vibrating gyroscope 20 shown in FIG. 6 as the sensitivity of the vibrator of the present embodiment, and the ratio of sensitivity between the sensitivity of the vibrating gyroscope 1 shown in FIG. 8 and the sensitivity of the vibrating gyroscope 20 shown in FIG. 6. In this case, the average value of sensitivity of ten conventional example is expressed as 1.00, and ten examples of sensitivity are shown separately, etc.

TABLE 3

| Sample No. | Sensitivity of conventional example | Sensitivity of embodiment | Ratio of sensitivity |
| --- | --- | --- | --- |
| 1 | 1.13 | 1.68 | 1.49 |
| 2 | 1.18 | 1.72 | 1.46 |
| 3 | 1.13 | 1.64 | 1.46 |
| 4 | 0.96 | 1.28 | 1.33 |
| 5 | 0.98 | 1.26 | 1.29 |
| 6 | 0.95 | 1.26 | 1.34 |
| 7 | 0.90 | 1.23 | 1.36 |
| 8 | 0.94 | 1.25 | 1.33 |
| 9 | 0.95 | 1.20 | 1.27 |
| 10 | 0.91 | 1.23 | 1.35 |
| Averagevalue | 1.00 | 1.37 | 1.37 |

From the results of Table 3, it can be understood that the sensitivity of the vibrating gyroscope 20 shown in FIG. 6 is higher than that of the vibrating gyroscope 1 shown in FIG. 8.

Furthermore, in the vibrating gyroscope 20 shown in FIG. 6, similar to the vibrating gyroscope 20 shown in FIG. 1, by changing the temperature characteristics of the amplification factor of the phase inversion circuit 38, it is possible to change the temperature characteristics of the application voltage of the other drive signal, which is output from the phase inversion circuit 38 and applied to the two resistors 40a and 40b, and consequently, it is possible to easily change the temperature characteristics of the sensitivity.

Figure 7:
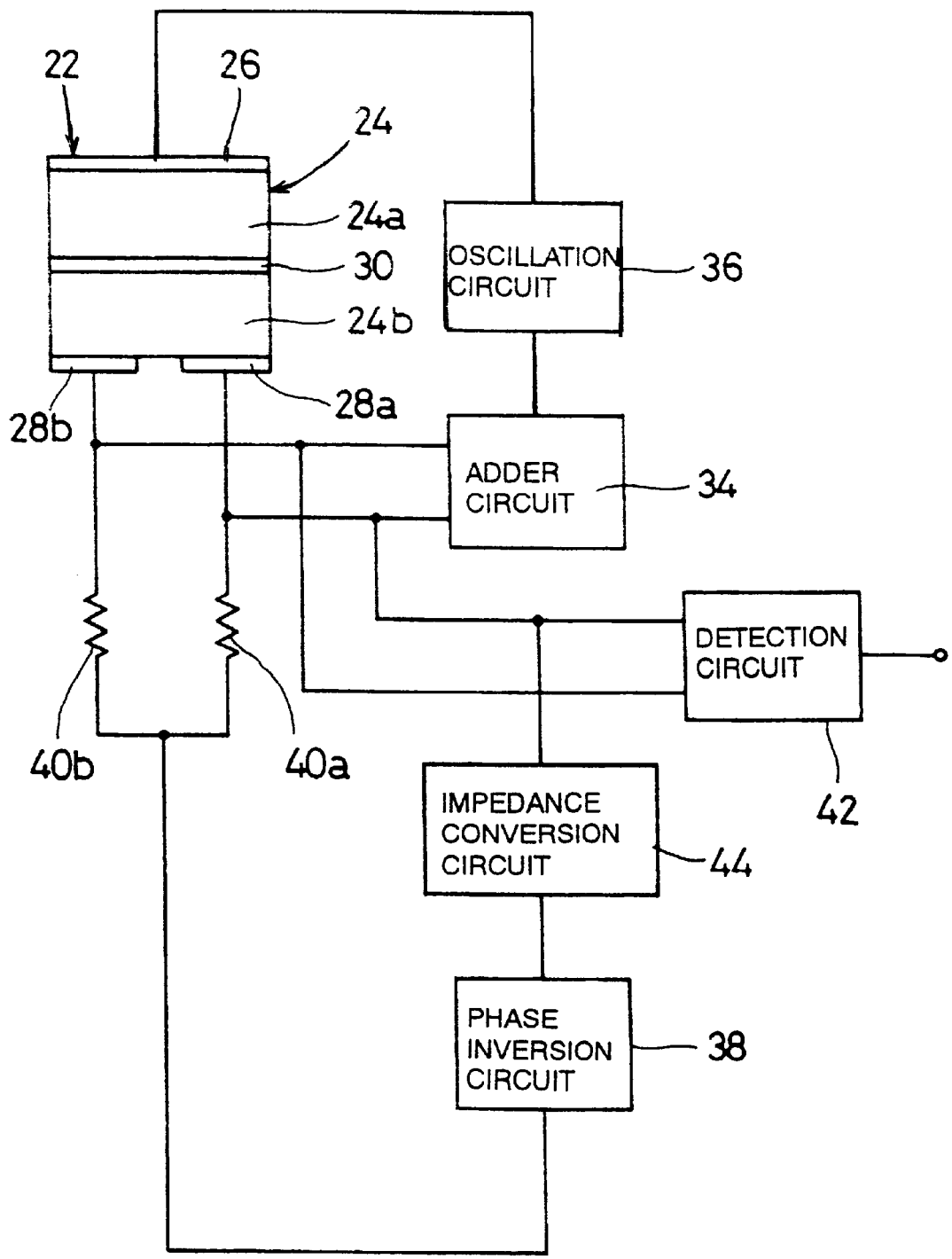
FIG. 7 is a diagrammatic view of yet another example of a vibrating gyroscope according to the present invention.

FIG. 7 is a diagrammatic view of yet another example of the vibrating gyroscope according to the present invention. In the vibrating gyroscope 20 shown in FIG. 7, in comparison with the vibrating gyroscope 20 shown in FIG. 1, one divide electrode 28a of the vibrator 22 connects to the input terminal of an impedance conversion circuit 44, the output terminal of the impedance conversion circuit 44 connects to the input terminal of the phase inversion circuit 38. This impedance conversion circuit 44 has a buffer function for eliminating difference in load on the divide electrode 28a of the vibrator 22 caused by the effect of the input impedance of the phase inversion circuit 38. The output terminal of the phase inversion circuit 38 connects via the resistors 40a and 40b to the two divide electrodes 28a and 28b of the vibrator 22.

In the vibrating gyroscope 20 shown in FIG. 7, a drive signal, output from the output terminal of the oscillator circuit 36 via the adder circuit 34, is applied to the common electrode 26 of the vibrator 22, and in addition, another drive signal, output from the output terminal of the phase inversion circuit 38 via the impedance conversion circuit 44, is applied via the resistors 40a and 40b to the two divided electrodes 28a and 28b of the vibrator 22. In this case, the drive signals have reverse phases.

Consequently, in comparison with the vibrating gyroscope 1 shown in FIG. 8, in the vibrating gyroscope 20 shown in FIG. 7, the amplitude of the drive signal applied between the common electrode of the vibrator and the two divided electrodes is greater, the sensitivity of detecting the rotational angular velocity is higher, the S/N is improved, and resolution is better.

Furthermore, in the vibrating gyroscope 20 shown in FIG. 7, by changing the temperature characteristics of the amplification factor of at least one of the impedance conversion circuit 44 and the phase inversion circuit 38, it is possible to change the temperature characteristics of the application voltage of the other drive signal, which is output from the phase inversion circuit 38 and applied to the two resistors 40a and 40b, and consequently, it is possible to easily change the temperature characteristics of the sensitivity.

In the vibrating gyroscope shown in the embodiments described above, another drive signal having a phase obtained by inverting the phase of the drive signal is applied to the two detecting electrodes, but the other signal may alternatively have a phase which is the inversion of the phase of the detected signal detected from the two detecting electrodes.

That is, the phase of the drive signal and the phase of the detected signal are generally the same in a vibrating gyroscope, but in accordance with the use of the vibrating gyroscope, the phase of the detected signal may be shifted from the phase of the drive signal, and in this case, in the present invention, the constitution need only be such that another drive signal having a phase obtained by inverting the phase of the detected signal is applied to the two detecting electrodes.

Each of the above vibrating gyroscopes uses a quadrilateral rod-like vibrating body having a bimorph structure, but in the present invention it is acceptable to use a vibrating body having a structure other than a bimorph structure, and furthermore, a vibrating body having a shape other than a quadrilateral rod, such as a triangular or circular rod, may be used.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
   a vibrator having a driving electrode and two detecting electrodes, the vibrator including first and second piezoelectric substrates which have respective opposed main surfaces and respective common surfaces laminated to each other and are polarized in the thickness direction in opposite directions with each other, the driving electrode being on the main surface of the first piezoelectric substrate and the two detecting electrodes being on the main surface of the second piezoelectric substrate;

a first drive circuit having an input side and an output side arranged such that the output side of the first drive circuit is connected to the driving electrode for applying a first drive signal to the driving electrode, and the input side of the first drive circuit is connected to the two detecting electrodes;

a second drive circuit having an input side and an output side arranged such that the output side of the second drive circuit is connected to the two detecting electrodes for applying to the two detecting electrodes a second drive signal having an inverted phase of a detection signal detected from at least one of the two detecting electrodes; and a detection circuit for detecting the detection signal in correspondence with the rotational angular velocity from the two detecting electrodes.

2. The vibrating gyroscope according to claim 1, wherein the first drive circuit comprises an adder circuit, two input terminals thereof being connected to the two detecting electrodes, and an oscillator circuit, an input terminal thereof being connected to an output terminal of the adder circuit, and the output terminal thereof being connected to the driving electrode.

3. The vibrating gyroscope according to claim 2, wherein the second drive circuit comprises a phase inversion circuit, an input terminal of the phase inversion circuit being connected to the output terminal of the adder circuit, and the output terminal being connected via two resistors to the two detecting electrodes.

4. The vibrating gyroscope according to claim 2, wherein the second drive circuit comprises a phase inversion circuit, an input terminal of the phase inversion circuit being connected to the output terminal of the oscillator circuit, and the output terminal being connected via two resistors to the two detecting electrodes.

5. The vibrating gyroscope according to claim 2, wherein the second drive circuit comprises an impedance conversion circuit, an input terminal thereof being connected to one of the two detecting electrodes; and a phase inversion circuit, an input terminal of the phase inversion circuit being connected to an output terminal of the impedance conversion circuit, and the output terminal being connected via two resistors to the two detecting electrodes.

6. The vibrating gyroscope according to claim 1, wherein the second drive circuit has predetermined temperature characteristics in order to give desired temperature characteristics to an applied voltage of the second drive signal.

7. The vibrating gyroscope according to claim 3, wherein the phase inversion circuit has predetermined temperature characteristics in order to give desired temperature characteristics to an applied voltage of the second drive signal.

8. A vibrating gyroscope comprising:

a vibrator having a driving electrode and two detecting electrodes, the vibrator including first and second piezoelectric substrates having respective opposed main surfaces and respective common surfaces laminated to each other, the driving electrode being on the main surface of the first piezoelectric substrate and the two detecting electrodes being on the main surface of the second piezoelectric substrate;

a first drive circuit having an input side and an output side arranged such that the output side of the first drive circuit is connected to the driving electrode for applying a first drive signal to the driving electrode, and the input side of the first drive circuit is connected to the two detecting electrodes;

an inverting circuit having an input side and an output side arranged such that the output side of the inverting circuit is connected to the two detecting electrodes for inverting the first driving signal to form a second drive signal having an inverted phase;

a second drive circuit for applying the second drive signal having an inverted phase of the first drive signal to the two detecting electrodes; and a detection circuit for detecting a detected signal in correspondence with the rotational angular velocity from the two detecting electrodes.

9. The vibrating gyroscope according to claim 8, wherein the first drive circuit comprises an adder circuit, two input terminals thereof being connected to the two detecting electrodes, and an oscillator circuit, an input terminal thereof being connected to an output terminal of the adder circuit, and the output terminal thereof being connected to the driving electrode.

10. The vibrating gyroscope according to claim 9, wherein an input terminal of the inverting circuit is connected to the output terminal of the adder circuit, and an output terminal of the inverting circuit is connected via two resistors to the two detecting electrodes.

11. The vibrating gyroscope according to claim 9, wherein an input terminal of the inverting circuit is connected to the output terminal of the oscillator circuit, and an output terminal of the inverting circuit is connected via two resistors to the two detecting electrodes.

12. The vibrating gyroscope according to claim 9, wherein the second drive circuit comprises an impedance conversion circuit, an input terminal thereof being connected to one of the two detecting electrodes; and an input terminal of the inverting circuit is connected to an output terminal of the impedance conversion circuit, and an output terminal of the inverting circuit is connected via two resistors to the two detecting electrodes.

13. The vibrating gyroscope according to claim 8, wherein the second drive circuit has predetermined temperature characteristics in order to give desired temperature characteristics to an applied voltage of the second drive signal.

14. The vibrating gyroscope according to claim 10, wherein the inverting circuit has predetermined temperature characteristics in order to give desired temperature characteristics to an applied voltage of the second drive signal.

* * * * *